United States Patent
Ji et al.

(12)

(10) Patent No.: US 11,823,062 B1
(45) Date of Patent: Nov. 21, 2023

(54) UNSUPERVISED REINFORCEMENT LEARNING METHOD AND APPARATUS BASED ON WASSERSTEIN DISTANCE

(71) Applicant: TSINGHUA UNIVERSITY, Beijing (CN)

(72) Inventors: Xiangyang Ji, Beijing (CN); Shuncheng He, Beijing (CN); Yuhang Jiang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/124,559

(22) Filed: Mar. 21, 2023

(51) Int. Cl.
*G06N 3/092* (2023.01)
*G06N 3/088* (2023.01)
*G06N 20/00* (2019.01)

(52) U.S. Cl.
CPC .............. *G06N 3/092* (2023.01); *G06N 3/088* (2013.01); *G06N 20/00* (2019.01)

(58) Field of Classification Search
CPC ........ G06N 20/00; G06N 20/10; G06N 20/20; G06N 3/02; G06N 3/08; G06N 3/088; G06N 3/0895; G06N 3/09; G06N 3/092
See application file for complete search history.

(56) References Cited

U.S. PATENT DOCUMENTS

| 2021/0004676 A1* | 1/2021 | Jaderberg | G06N 3/08 |
| 2022/0080586 A1* | 3/2022 | Otto | B25J 9/163 |
| 2023/0045360 A1* | 2/2023 | Garg | G06N 20/00 |

* cited by examiner

*Primary Examiner* — Shane D Woolwine

(57) ABSTRACT

The present disclosure discloses an unsupervised reinforcement learning method and apparatus based on Wasserstein distance. The method includes: obtaining a state distribution in a trajectory obtained with guidance of a current policy of an agent; calculating a Wasserstein distance between the state distribution and a state distribution in a trajectory obtained with another historical policy, and calculating a pseudo reward of the agent based on the Wasserstein distance, replacing a reward fed back from an environment in a target reinforcement learning framework with the pseudo reward, and guiding the current policy of the agent to keep a large distance from the other historical policy. The method uses Wasserstein distance to encourage an algorithm in an unsupervised reinforcement learning framework to obtain diverse policies and skills through training.

14 Claims, 4 Drawing Sheets

UNSUPERVISED REINFORCEMENT LEARNING METHOD AND APPARATUS BASED ON WASSERSTEIN DISTANCE

FIELD

The present disclosure relates to the field of deep learning technologies, and more particularly, to an unsupervised reinforcement learning method and apparatus based on Wasserstein distance.

BACKGROUND

Reinforcement learning is a complex research field in the field of machine learning, and aims at solving a class of sequential decision problems. In this class of sequential decision problems, it is set that an agent needs to perceive information from an environment (e.g., visual information obtained by a vision sensor of an unmanned vehicle, and state information such as an angle and a speed of a mechanical arm), calculate an action through a built-in policy model, and then impose the action on the environment. The agent repeatedly interacts with the environment in this way. In reinforcement learning, a goal of the agent is to maximize a reward fed back from the environment. Different from conventional algorithms in fields of natural language processing and computer vision, a reinforcement learning method is committed to solving a class of more general problems such as human-machine interaction, game, robot control, etc., and can also be applied to the fields of natural language processing and computer vision. Therefore, reinforcement learning has broad prospects in realizing artificial general intelligence, and is a current frontier research field.

Compared with the above described classical reinforcement learning, unsupervised reinforcement learning is committed to enabling the agent to successfully learn a series of policies or skills without any reward fed back from the environment. When feedback from the environment is available again, these learned policies or skills can be regarded as a pre-training model to accelerate a training process. In hierarchical reinforcement learning, these learned policies or skills can be used as original options. In unsupervised reinforcement learning, the key problem is how a series of more diversified policies or skills can be learned to help the agent explore a state space more effectively.

Most existing unsupervised reinforcement learning algorithms mainly control behaviors of the agent indirectly through inputting a latent variable to a model and maximizing mutual information. Thus, a series of diversified policies or skills are obtained by changing a value of the latent variable each time.

Calculation of the mutual information may be equivalent to calculation of Jensen-Shannon divergence (JS divergence, a measurement method for a difference between two probability distributions) between two conditional probability distributions. Therefore, these mutual information-based methods are limited by limitations of JS divergence itself, and can only successfully distinguish different policies or skills, without encouraging as much differentiation as possible between different policies. Therefore, a lack of efficiency in exploring the state space persists.

SUMMARY

The present disclosure aims to solve at least one of the technical problems in the related art to some extent.

To this end, one object of the present disclosure is to provide an unsupervised reinforcement learning method based on Wasserstein distance. The method can use Wasserstein distance to encourage an algorithm in an unsupervised reinforcement learning framework to obtain a series of diversified policies or skills through training.

Another object of the present disclosure is to provide an unsupervised reinforcement learning apparatus based on Wasserstein distance.

To achieve the above objects, in one aspect, embodiments of the present disclosure provide an unsupervised reinforcement learning method based on Wasserstein distance. The method includes: obtaining a state distribution in a trajectory obtained with guidance of a current policy of an agent; calculating a Wasserstein distance between the state distribution and a state distribution in a trajectory obtained with another historical policy; and calculating a pseudo reward of the agent based on the Wasserstein distance, replacing a reward fed back from an environment in a target reinforcement learning framework with the pseudo reward, and guiding the current policy of the agent to keep a large distance from the other historical policy.

To achieve the above objects, in another aspect, embodiments of the present disclosure provide an unsupervised reinforcement learning apparatus based on Wasserstein distance. The apparatus includes: an obtaining module configured to obtain a state distribution in a trajectory obtained with guidance of a current policy of an agent; a calculation module configured to calculate a Wasserstein distance between the state distribution and a state distribution in a trajectory obtained with another historical policy; and a learning module configured to calculate a pseudo reward of the agent based on the Wasserstein distance, replace a reward fed back from an environment in a target reinforcement learning framework with the pseudo reward, and guide the current policy of the agent to keep a large distance from the other historical policy.

The unsupervised reinforcement learning method and apparatus based on Wasserstein distance according to embodiments of the present disclosure provide an unsupervised reinforcement learning framework based on Wasserstein distance, which provides a new problem-solving idea for the existing filed of unsupervised reinforcement learning. An existing mutual information-based algorithm is limited to an inability to encourage a large distance between policies or skills, leading to a lack of efficiency in exploring a state space. The method provided by the present disclosure encourages the agent to acquire different policies with great differences by means of "pseudo rewards" to explore the state space more effectively. Thus, more diverse pre-training models are provided for quick adaptation to a task target when a reward is given by an environment.

Additional aspects and advantages of the present disclosure will be provided at least in part in the following description, or will at least in part become apparent from the following description or be learned from practicing of the present disclosure.

BRIEF DESCRIPTION OF THE DRAWINGS

The above and/or additional aspects and advantages of the present disclosure will become more apparent and more understandable from the following description of embodiments in conjunction with the accompanying drawings, in which.

DETAILED DESCRIPTION

Figure 1:
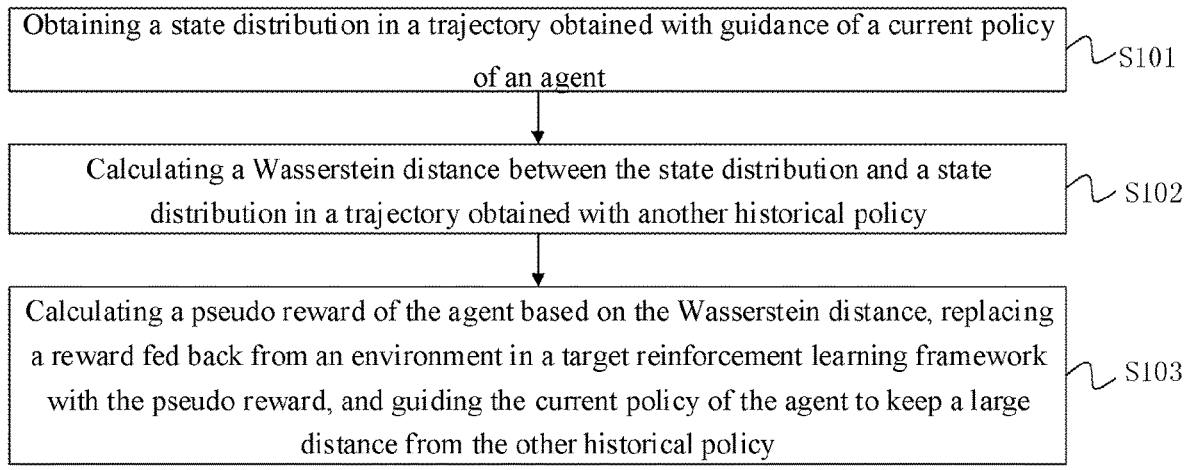
FIG. 1 is a flowchart of an unsupervised reinforcement learning method based on Wasserstein distance according to an embodiment of the present disclosure.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

An unsupervised reinforcement learning method and apparatus based on Wasserstein distance according to embodiments of the present disclosure will be described below with reference to the accompanying drawings.

The unsupervised reinforcement learning method based on Wasserstein distance according to an embodiment of the present disclosure will first be described with reference to the accompanying drawings.

FIG. 1 is a flowchart of an unsupervised reinforcement learning method based on Wasserstein distance according to an embodiment of the present disclosure.

As illustrated in FIG. 1, the unsupervised reinforcement learning method based on Wasserstein distance may include operations at block S101 to block S103.

At block S101, a state distribution in a trajectory obtained with guidance of a current policy of an agent is obtained.

At block S102, a Wasserstein distance between the state distribution and a state distribution in a trajectory obtained with another historical policy is calculated.

The present disclosure is a framework for enabling the agent to learn a series of diversified policies based on Wasserstein distance. In this framework, different policies of the agent are encouraged to have as much differentiation as possible to explore a state space more efficiently.

At block S103, a pseudo reward of the agent is calculated based on the Wasserstein distance, a reward fed back from an environment in a target reinforcement learning framework is replaced with the pseudo reward, and the current policy of the agent is guided to keep a large distance from the other historical policy.

Optionally, in an embodiment of the present disclosure, the operation of calculating the pseudo reward of the agent based on the Wasserstein distance includes: making, based on a state variable obtained from a current observation of the agent, a decision using a policy model of the agent to obtain an action variable, and interacting with the environment to obtain the pseudo reward.

Optionally, in an embodiment of the present disclosure, the method further includes, subsequent to calculating the pseudo reward of the agent: optimizing, based on a deep reinforcement learning framework, a policy model of the agent using gradient back propagation.

In order to enable the agent to efficiently and fully explore the state space when feedback from the environment is unavailable (sometimes when a target task is not specified), the present disclosure provides an unsupervised reinforcement learning framework based on Wasserstein distance, which enables the agent to perform training spontaneously to obtain a variety of policies with as much differentiation from each other as possible to fully explore the state space. In the framework of the present disclosure, the Wasserstein distance between the state distribution in the trajectory obtained with the guidance of the current policy of the agent and the state distribution in the trajectory obtained with the other historical policy is calculated. Further, the "pseudo reward" of the agent is calculated based on the Wasserstein distance. The reward fed back from the environment in a conventional reinforcement learning framework is replaced with the "pseudo reward" to encourage and guide the policy of the agent to possibly keep as large a distance as possible from the other historical policy. In actual use, an artificial neural network is used as the policy model of the agent. The decision is made based on the state variable obtained from the current observation of the agent to obtain the action variable. Further, the agent interacts with the environment. After the "pseudo reward" is obtained, a policy network of the agent is optimized based on the deep reinforcement learning framework using the gradient back propagation.

Figure 2:
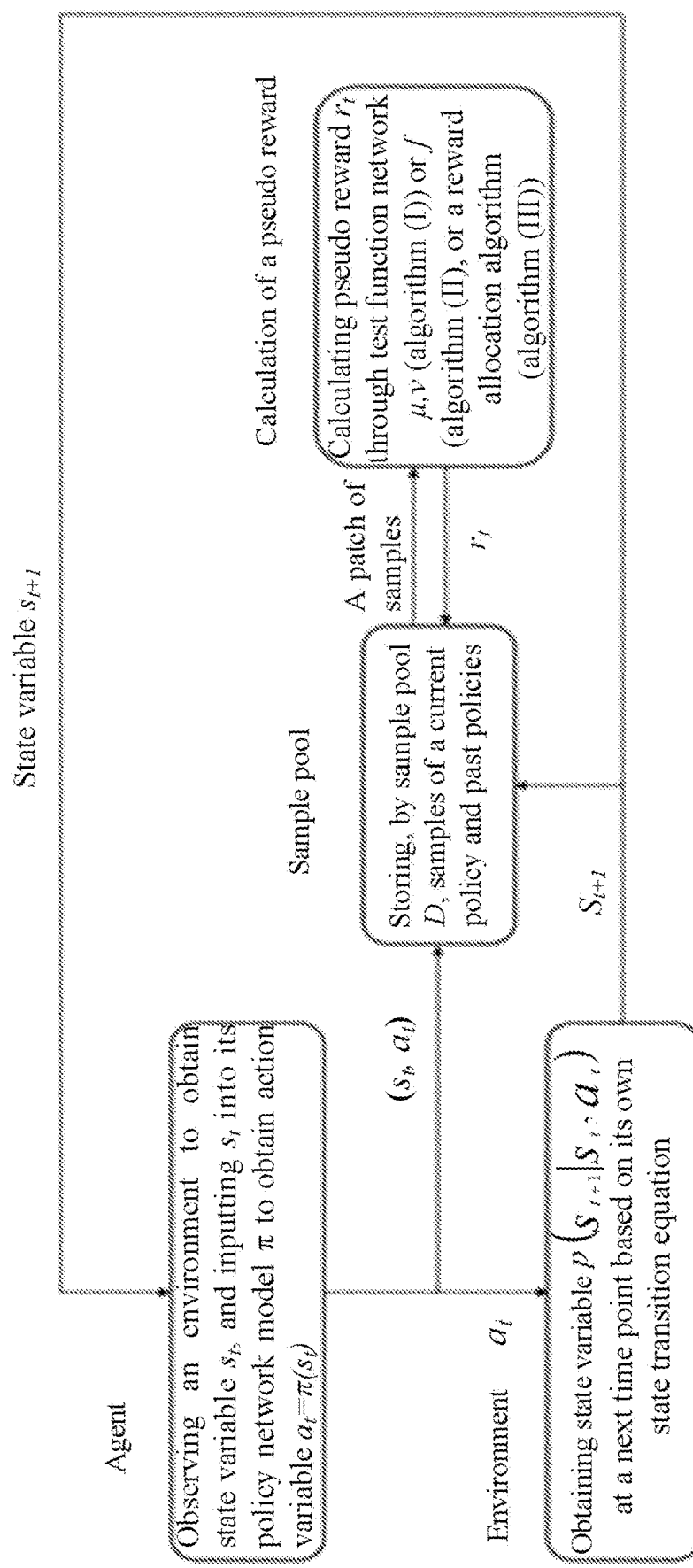
FIG. 2 is a relation diagram of physical quantities in an unsupervised reinforcement learning framework based on Wasserstein distance according to an embodiment of the present disclosure.

FIG. 2 illustrates a relation between physical quantities in the unsupervised reinforcement learning framework based on Wasserstein distance. The unsupervised reinforcement learning method based on Wasserstein distance of the present disclosure will be described below with specific embodiments and the accompanying drawings.

Let p, q each represent a distribution over domain $\mathcal{X} \subseteq \mathbb{R}^m$, $\mathcal{Y} \subseteq \mathbb{R}^n$, and $\Gamma[p,q]$ represent that each marginal distribution is a joint distribution of p,q over domain $\mathcal{X} \times \mathcal{Y}$. Then when a suitable cost function $c(x,y): \mathcal{X} \times \mathcal{Y} \rightarrow \mathbb{R}$ is provided to measure a cost of transporting each x to y, Wasserstein distance is designed to measure a difference between such two distributions:

$$W_c(p, q) = \inf_{\gamma \in \Gamma[p,q]} \int_{\mathcal{X} \times \mathcal{Y}} c(x, y) dy. \tag{1}$$

Ways to estimate Wasserstein distance can generally be categorized into a primal form estimation and a dual form estimation, on which basis several different algorithms in the framework of the present disclosure are established.

The first algorithm uses the dual form estimation of Wasserstein distance. Define a set $\mathcal{A} = \{(u,v) | \forall (x,y) \in \mathcal{X} \times \mathcal{Y}: u(x) - v(y) \leq c(x,y)\}$, and let $\mu: \mathcal{X} \rightarrow \mathbb{R}$, $v: \mathcal{Y} \rightarrow \mathbb{R}$ represent two continuous functions, then a dual form of Wasserstein distance can be obtained based on Fenchel-Rockafellar duality as:

$$W_c(p, q) = \sup_{\mu, v \in \mathcal{A}} \mathbb{E}_{x \sim p(x), y \sim q(y)} [\mu(x) - v(y)]. \tag{2}$$

When $\mathcal{X} = \mathcal{Y}$, i.e., when the two distributions are in a same space, another dual form can be obtained based on Kantorovich-Rubinstein duality as:

$$W_c(p, q) = \sup_{\|f\|_L \leq 1} \mathbb{E}_{x \sim p(x), y \sim q(y)}[f(x) - f(y)]. \quad (3)$$

Based on the above results, the first algorithm (I) provided by the present disclosure can be obtained.

Figure 3:
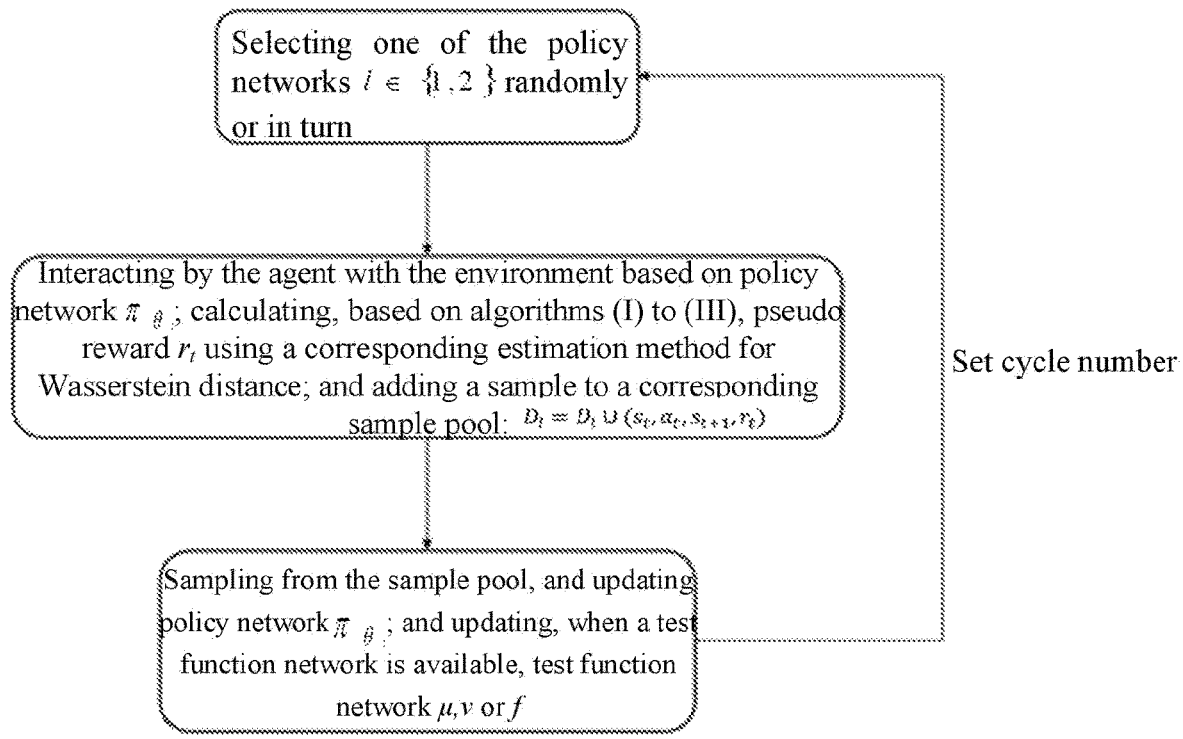
FIG. 3 is a schematic diagram of a cycle in an unsupervised reinforcement learning framework based on Wasserstein distance according to an embodiment of the present disclosure.

First, two policy networks $\pi_{\theta_1}$ and $\pi_{\theta_2}$, two sample pools $D_1 = \{\ \}$, $D_2 = \{\ \}$ corresponding to the two policy networks, and a test function network $\mu, \nu$ (see equation (2)) or $f$ (see equation (3)) are initialized. Then the flowing step 1 to step 3 are repeated before reaching a predetermined iteration number. A schematic diagram of the following step 1 to step 3 is illustrated in FIG. 3.

In step 1, a specific policy network is selected.

One of the policy networks $l \in \{1,2\}$ is selected randomly or in turn.

In step 2, empirical data is obtained from the agent interacting with the environment.

At time point t, let $s_t$ represent an environment state variable observed by the agent. Mapping from an observation to an action vector within the agent is composed of an end-to-end deep neural network. When the observation is picture information, a convolutional neural network is adopted for a processing. When the observation is vector information, a multilayer perceptron is adopted for a processing. The agent inputs its observed $s_t$ into policy network $\pi_{\theta_1}$ to obtain action variable $a_t$. After receiving $a_t$, the environment obtains state variable $s_{t+1}$ at a next time point based on its internal state transition equation. In the framework provided by the present disclosure, the "pseudo reward" is obtained based on the following equation as:

$$r_t = \begin{cases} f(s_t) \text{ or } \mu(s_t), l = 1 \\ -f(s_t) \text{ or } -\nu(s_t), l = 2 \end{cases}.$$

Then corresponding samples are added to a corresponding sample pool: $D_l = D_l \cup \{(s_t, a_t, s_{t+1}, r_t)\}$.

In the step 3, the policy network and the test function network of the agent are trained.

The policy network of the agent is optimized, based on a deep reinforcement learning algorithm, using the gradient back propagation and through sampling from the sample pool in step 2. In the embodiments of the present disclosure, a selection of the deep reinforcement learning algorithm is adjustable and diverse. Empirically, a selection of algorithm Soft Actor-Critic (SAC) can provide a better result. On the other hand, the test function network is optimized, based on equation (2) or equation (3), using samples obtained from the sampling to obtain a more accurate Wasserstein distance estimation.

Correspondingly, another algorithm (II) provided by the present disclosure can be derived using the primal form estimation of Wasserstein distance as:

First, two policy networks $\pi_{\theta_1}$ and $\pi_{\theta_2}$ and two sample pools $D_1 = \{\ \}$, $D_2 = \{\ \}$ corresponding to the two policy networks are initialized. Then the following step 1 to step 3 are repeated before reaching a predetermined iteration number. A schematic diagram of the following step 1 to step 3 is illustrated in FIG. 3.

In step 1, a specific policy network is selected.

One of the policy networks $l \in \{1,2\}$ is selected randomly or in turn, and trajectory $S = \{\ \}$ is initialized.

In step 2, empirical data is obtained from the agent interacting with the environment.

Similar to the step 2 of the first algorithm, at time point t, an environment state variable observed by the agent is represented by $s_t$. Mapping from an observation to an action vector within the agent is composed of an end-to-end deep neural network. The agent inputs its observed $s_t$ into the policy network to obtain action variable $a_t$. After receiving $a_t$, the environment obtains state variable $s_{t+1}$ at a next time point based on its internal state transition equation. The state variable is added to trajectory $S = S \cup (s_{t+1})$.

When trajectory $S = S \cup \{s_{t+1}\}$ ends at time point t, a batch of state variable samples $\mathcal{T}$ is sampled from sample pool $D_{3-l}$, and "pseudo reward" $r_t = W(S, \mathcal{T})$ is calculated using the primal form estimation of Wasserstein distance, otherwise $r_t = 0$.

Corresponding samples are added to the corresponding sample pool: $D_l = D_l \cup \{(s_t, a_t, s_{t+1}, r_t)\}$.

In the step 3, the policy network of the agent is trained.

Similar to the step 3 of the first algorithm, the policy network of the agent is optimized, based on the deep reinforcement learning algorithm, using the gradient back propagation and through sampling from a corresponding sample pool. In the embodiments of the present disclosure, a selection of the deep reinforcement learning algorithm is adjustable and diverse. Empirically, a selection of algorithm SAC can provide a better result.

The above two algorithms still have some drawbacks: a) the algorithm based on the dual form estimation cannot be well extended to training of three and more different policies; and b) the "pseudo reward" of the algorithm based on the primal form estimation is too sparse, which is a great challenge for the deep reinforcement learning algorithm.

Therefore, the present disclosure provides the third algorithm that can address the above limitations. First, to obtain three and more different policies through training, the primal form estimation of the Wasserstein distance is used in this algorithm, and an average distribution of state variables obtained from all policies other than the current policy is used as a target distribution from which a maximum distance needs to be kept. To solve the problem of sparse "pseudo reward", the present disclosure optimizes the calculation method of the "pseudo reward" in step 2 of the second algorithm, and provides the following reward allocation algorithm (III).

Figure 4:
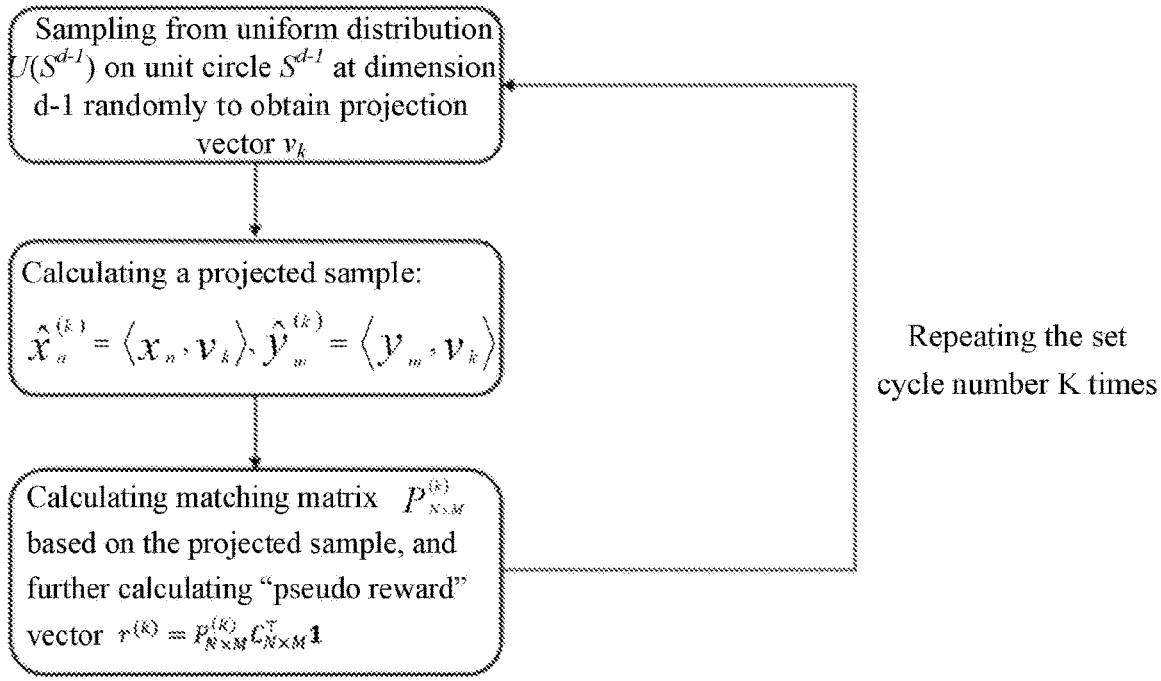
FIG. 4 is a schematic diagram of a cycle in a reward allocation algorithm according to an embodiment of the present disclosure.

A batch of state variable samples $S = \{x_n\}_{n=1}^N$ and state variable sample $S = \{y_m\}_{m=1}^M$ of the target distribution from which a distance needs to be kept are provided, and it is assumed that distributions of these two batches of samples are $p, q \in \mathcal{X}^d$. A cost matrix $C_{N \times M}$ is calculated. A cycle number K is set, and the following step 1 to step 3 are repeated. A schematic diagram of the following step 1 to step 3 is illustrated in FIG. 4.

In step 1, sampling is performed to obtain a projection vector.

$v_k$ is randomly sampled from uniform distribution $\mathcal{U}(\mathcal{S}^{d-1})$ on unit circle $\mathcal{S}^{d-1}$ at dimension $d-1$.

In step 2, a projected sample is calculated.

The projected sample is calculated through: $\hat{x}_n^{(k)} = \langle x_n, v_k \rangle$, $\hat{y}_m^{(k)} = \langle y_m, v_k \rangle$.

In step 3, a matching matrix $P_{N \times M}^{(k)}$ is calculated based on the projected sample in step 2, and then the "pseudo reward" vector $r^{(k)} = P_{N \times M}^{(k)} C_{N \times M}^T 1$ is calculated.

The "pseudo reward"

$$r = \frac{1}{K}\sum\nolimits_{k=1}^{K} r^{(k)}$$

calculated based on the above results.

The unsupervised reinforcement learning method based on Wasserstein distance according to embodiments of the present disclosure provide an unsupervised reinforcement learning framework based on Wasserstein distance, which provides a new problem-solving idea for the existing filed of unsupervised reinforcement learning. An existing mutual information-based algorithm is limited to an inability to encourage a large distance between policies or skills, leading to a lack of efficiency in exploring a state space. The method provided by the present disclosure encourages the agent to acquire different policies with great differences by means of "pseudo rewards" to explore the state space more effectively. Thus, more diverse pre-training models are provided for quick adaptation to a task target when a reward is given by an environment.

The unsupervised reinforcement learning apparatus based on Wasserstein distance according to embodiments of the present disclosure will be described with reference to the accompanying drawings.

Figure 5:
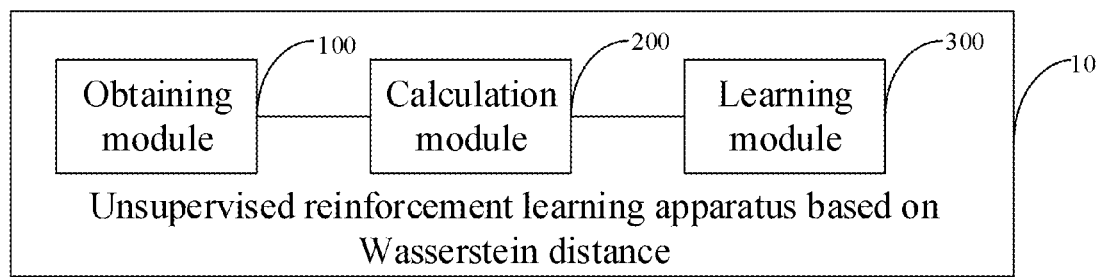
FIG. 5 is a schematic diagram of a structure of an unsupervised reinforcement learning apparatus based on Wasserstein distance according to an embodiment of the present disclosure.

FIG. 5 is a schematic diagram of a structure of an unsupervised reinforcement learning apparatus based on Wasserstein distance according to an embodiment of the present disclosure.

As illustrated in FIG. 5, the unsupervised reinforcement learning apparatus based on Wasserstein distance includes an obtaining module 100, a calculation module 200, and a learning module 300.

The obtaining module 100 is configured to obtain a state distribution in a trajectory obtained with guidance of a current policy of an agent. The calculation module 200 is configured to calculate a Wasserstein distance between the state distribution and a state distribution in a trajectory obtained with another historical policy. The learning module 300 is configured to calculate a pseudo reward of the agent based on the Wasserstein distance, replace a reward fed back from an environment in a target reinforcement learning framework with the pseudo reward, and guide the current policy of the agent to keep a large distance from the other historical policy.

Optionally, in an embodiment of the present disclosure, the calculation module is further configured to make, based on a state variable obtained from a current observation of the agent, a decision using a policy model of the agent to obtain an action variable, and interact with the environment to obtain the pseudo reward.

Optionally, in an embodiment of the present disclosure, the apparatus further includes an optimization module configured to optimize, based on a deep reinforcement learning framework, a policy model of the agent using gradient back propagation, subsequent to calculating the pseudo reward of the agent.

It should be noted that the above explanation of the method embodiments is also applicable to the apparatus of this embodiment, and thus details thereof will not be repeated here.

The unsupervised reinforcement learning apparatus based on Wasserstein distance according to embodiments of the present disclosure provide an unsupervised reinforcement learning framework based on Wasserstein distance, which provides a new problem-solving idea for the existing filed of unsupervised reinforcement learning. An existing mutual information-based algorithm is limited to an inability to encourage a large distance between policies or skills, leading to a lack of efficiency in exploring a state space. The method provided by the present disclosure encourages the agent to acquire different policies with great differences by means of "pseudo rewards" to explore the state space more effectively. Thus, more diverse pre-training models are provided for quick adaptation to a task target when a reward is given by an environment.

In addition, terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "plurality" means at least two, unless otherwise specifically defined.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are merely exemplary, and cannot be construed to limit the present disclosure. For those skilled in the art, changes, alternatives, and modifications can be made to the embodiments without departing from the scope of the present disclosure.

What is claimed is:

1. An unsupervised reinforcement learning method based on Wasserstein distance, comprising:
   obtaining a state distribution in a trajectory obtained with guidance of a current policy of an agent;
   calculating a Wasserstein distance between the state distribution and a state distribution in a trajectory obtained with another historical policy; and
   calculating a pseudo reward of the agent based on the Wasserstein distance, replacing a reward fed back from an environment in a target reinforcement learning framework with the pseudo reward, and guiding the current policy of the agent to keep a maximum distance from the other historical policy.

2. The method according to claim 1, wherein said calculating the pseudo reward of the agent based on the Wasserstein distance comprises:
   making, based on a state variable obtained from a current observation of the agent, a decision using a policy model of the agent to obtain an action variable, and interacting with the environment to obtain the pseudo reward.

3. The method according to claim 1, further comprising, subsequent to calculating the pseudo reward of the agent:
   optimizing, based on a deep reinforcement learning framework, a policy model of the agent using gradient back propagation.

4. The method according to claim 1, wherein the Wasserstein distance is a dual form estimation.

5. The method according to claim 2, wherein the Wasserstein distance is a dual form estimation.

6. The method according to claim 3, wherein the Wasserstein distance is a primal form estimation.

7. The method according to claim 3, wherein the Wasserstein distance is a primal form estimation, and wherein an average distribution of state variables obtained from all policies other than the current policy is used as a target distribution from which a maximum distance needs to be kept.

8. An unsupervised reinforcement learning apparatus based on Wasserstein distance, comprising a processor and a memory storing an executable program, wherein the executable program, when performed by the processor, implements:
- obtaining a state distribution in a trajectory obtained with guidance of a current policy of an agent;
- calculating a Wasserstein distance between the state distribution and a state distribution in a trajectory obtained with another historical policy; and
- calculating a pseudo reward of the agent based on the Wasserstein distance, replacing a reward fed back from an environment in a target reinforcement learning framework with the pseudo reward, and guiding the current policy of the agent to keep a maximum distance from the other historical policy.

9. The apparatus according to claim 8, wherein the executable program, when performed by the processor, further implements: making, based on a state variable obtained from a current observation of the agent, a decision using a policy model of the agent to obtain an action variable, and interacting with the environment to obtain the pseudo reward.

10. The apparatus according to claim 8, wherein the executable program, when performed by the processor, further implements:
- optimizing, based on a deep reinforcement learning framework, a policy model of the agent using gradient back propagation, subsequent to calculating the pseudo reward of the agent.

11. The apparatus according to claim 8, wherein the Wasserstein distance is a dual form estimation.

12. The apparatus according to claim 9, wherein the Wasserstein distance is a dual form estimation.

13. The apparatus according to claim 10, wherein the Wasserstein distance is a primal form estimation.

14. The apparatus according to claim 10, wherein the Wasserstein distance is a primal form estimation, and wherein an average distribution of state variables obtained from all policies other than the current policy is used as a target distribution from which a maximum distance needs to be kept.

* * * * *